June 17, 1969 R. J. MELTZER 3,450,477

OPTICAL SYSTEM

Filed June 25, 1965 Sheet 1 of 2

ROBERT J. MELTZER
INVENTOR

BY
ATTORNEYS

United States Patent Office 3,450,477
Patented June 17, 1969

3,450,477
OPTICAL SYSTEM
Robert J. Meltzer, Irondequoit, N.Y., assignor to Bausch & Lomb Incorporated, Rochester, N.Y., a corporation of New York
Filed June 25, 1965, Ser. No. 466,940
Int. Cl. G01n 21/44
U.S. Cl. 356—114                    5 Claims

ABSTRACT OF THE DISCLOSURE

An optical system is disclosed for measuring rotational movement about the line of sight. A polarized beam of radiation is directed and redirected through a quarter-wave plate which rotates the plane of polarization of the beam in accordance with the position of its optical axis relative to the plane of polarization of the beam. The rotated beam is modulated and applied through an analyzer to a radiation sensitive detector which generates a signal corresponding to the rotational position of the quarter-wave plate about the beam.

---

This invention relates to a novel magneto-optical device and more particularly to an improved optical system of the type previously disclosed and claimed in my copending U. S. application entitled Magneto-Optical System, Ser. No. 291,998, filed July 1, 1963 and assigned to the same assignee as the present application.

The magneto-optical systems disclosed and claimed in my copending application are characterized by position sensitvie polarization means which include a pair of optical active elements of opposite rotation. Magneto-optical modulating means, and electrical means are provided for producing a signal. The phase of the signal depends on the sense while the amplitude depends on the amount of displacement of an image from the optical axis.

In designing optical positioning and measuring systems of the types disclosed and claimed herein, it is desirable to have a wide range i.e. the capability of locating a line within a wide field. The systems should also be insensitive to focal variations and capable of high speed variation. Furthermore, the systems should be capable of measuring as well as detecting departure from an exact set as well as indicating the direction of departure from a set position.

The accuracy of an autocollimator according to the present invention is such that it enables an operator to position a line with an accuracy of one microinch or better. The systems have a wide range, are relatively insensitive to focal variations and are capable of high speed operations. In addition to the aforementioned features the systems have a minimum of moving parts and yet are capable of measuring departure from an exact set and indicating the direction of departure.

The systems according to the present invention are characterized by all of the aforementioned desirable features. The primary characteristic which is a marked improvement over the previously disclosed devices resides in the means for accurately sensing rotation about the line of sight.

Briefly, the devices according to the present invention include the combination of position sensitive polarization means which include a pair of optical active elements of opposite rotation, magneto-optical modulation means and electrical means for producing a signal. The phase of the signal depends on the sense while the amplitude depends on the amount of displacement of an image from the optic axis. The improvement which characterizes the present invention comprises means for sensing rotation around the line of sight. For example, a quarter-wave length plate is combined with a mirror so that the combination acts as a half-wave plate because of the double pass through the quarter-wave plate. A half-wave plate polarizes light in the manner that light entering the half-wave length plate at an angle $\theta$ from the preferred orientation of the half-wave plate, leaves the plate at an angle of $(-\theta)$ from the preferred orientation. Therefore, if the analyzer and polarizer are coupled, so that, as the polarizer rotates about the line of sight the analyzer does likewise, the net result is that the half-wave plate appears to have rotated through an angle of $2\theta$.

The basic theory underlies the magneto-optical phenomena is set forth in some detail in the published article entitled "Magneto-Optic Positioning" by R. J. Meltzer, which appears in IEEE Transactions on Industrial Electronics, vol. IE10, No. 1, May 1963.

Magneto-optical modulators for Faraday modulation may be described as follows. A system including a light source, and a pair of polarizers, has a modulator disposed between the polarizers and a photodetector. The light source may be considered to include a lamp, collimator and a narrow band filter for producing nominally monochromatic light. The modulator may comprise a piece of flint glass or other transparent material within a coil of wire. Passing alternating current through the wire produces a magnetic field within the coil. The direction and magnitude of this magnetic field varies as the current in the coil varies. The plane of polarization of light passing through the glass is rotated by the magnetic field according to the Faraday magneto-optic effect. The angle through which the plane is rotated depends on the material, the length of the path through the material and the strength of the magnetic field. The direction of the rotation depends on the magnetic field. The transparent materials have a Verdet constant which gives the angular rotation in minutes of arc, per centimeter of path, per gauss of field.

Since the two polarizers are at right angles to each other light will not pass through the polarizer to the detector in the absence of a magnetic field. However, with a magnetic field, light will pass to the detector as the plane of polarization is rotated by the field. Therefore, the light intensity impinging upon the photocell varies according to the changes in rotation caused by the alternating current produced field in the modulator. Measurement of the rotation may be accomplished by measuring the amplitude of the frequency and by knowing the constant of the system which depends on the material, the path length and the peak modulating current.

The photodetector produces an electrical signal in response to the light intensity impinging thereupon. The electrical signal is amplified and fed into a demodulator which is connected to a meter for indicating the displacement and direction.

The invention will now be described in connection with the accompanying drawings in which, FIG. 1 is a diagrammatic illustration of a magneto-optical system according to the aforementioned copending application;

Figure 1:
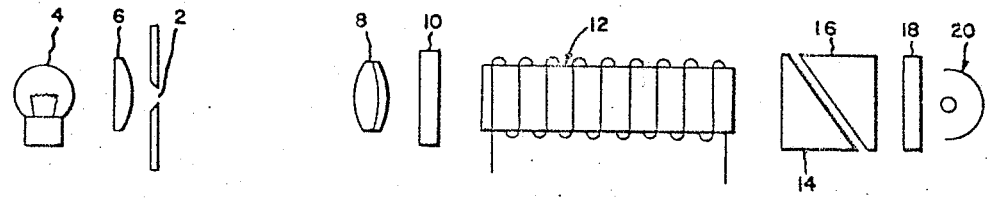

A magneto-optical positioning system according to the prior art is shown in FIG. 1 wherein the location of a line is determined by means of illuminating a slit 2 with an illumination system comprising a light source 4 and collimating lens 6. This produces a light line in a dark field, and even though the system will work equally well with a dark line in a bright field, the former is used by way of illustration. The line so formed is imaged by a lens 8. The light rays forming the image pass through a polarizer 10 and modulator 12. The light then passes through a pair of prisms 14 and 16 and through a second polarizer 18 to a photocell 20.

The two quartz prisms 14 and 16 are identical except that one is made of left-hand quartz and the other of right-hand quartz. Therefore, if the light falls along a plane such that the path through the left-hand quartz with respect to the path through the right-hand quartz are equal, there will be no rotation caused by the pair of prisms. When the image falls on either side of the aforementioned position there will be a rotation caused by the quartz prisms. This rotation will be either right-hand or left-hand dependent upon which side of the null plane the image passes. The amount of rotation is proportional to the displacement of the image.

For example, if the angle on the quartz prisms is such that a displacement of the line image by one millimeter decreases the left-hand quartz path by 0.5 millimeter, and increases the right-hand quartz path by 0.5 millimeter, the total rotation will equal the rotation produced by one millimeter of quartz. At the D line of sodium this rotation is equal to 22° per millimeter.

Figure 2:
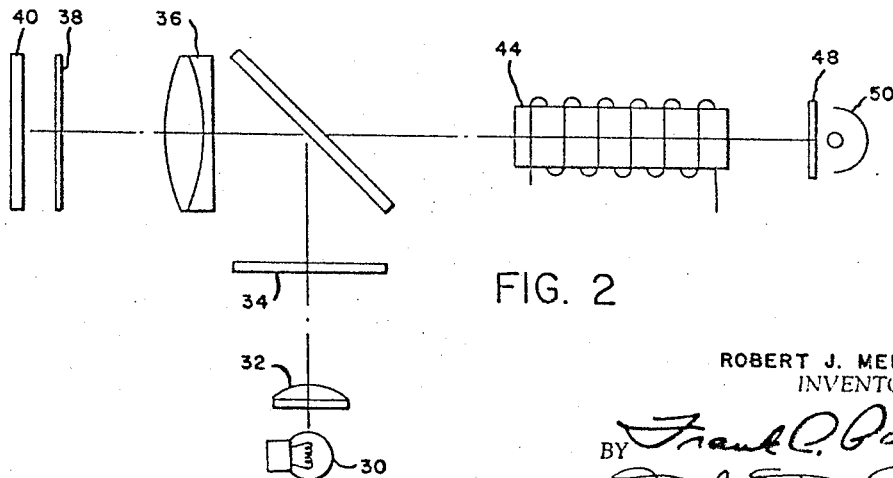
FIG. 2 is a diagrammatic illustration of a magneto-optical device according to the present invention.

FIG. 2 illustrates a magneto-optical device which is adapted to sense rotation around the line of sight. Light from a light source 30 passes through a condenser lens 32 and polarizer 34. The polarized light is reflected by an inclined beam divider and directed toward a collimator 36. The collimated light passes through a quarter-wave plate 38 and is reflected back through the plate 38 by a mirror 40. The combination of the mirror 40 and quarter-wave plate 38 is such that the combination acts as a half-wave plate because of a double pass through the quarter-wave plate.

The property of a half-wave plate is such that polarized light which enters the half-wave plate at an angle $\theta$ from the preferred orientation of the half-wave plate, leaves the plate at an angle of $(-\theta)$ from the preferred orientation. The net result is that the half-wave plate appears to have rotated through an angle $2\theta$. The light passing through the beam divider passes through a modulator 44 before passing through the analyzer 48. The light passing the analyzer 48 is incident upon a photodetector 50. The results obtained by the present arrangement indicate that detection of a rotation of 1½ arc seconds can be assured.

Figure 3:
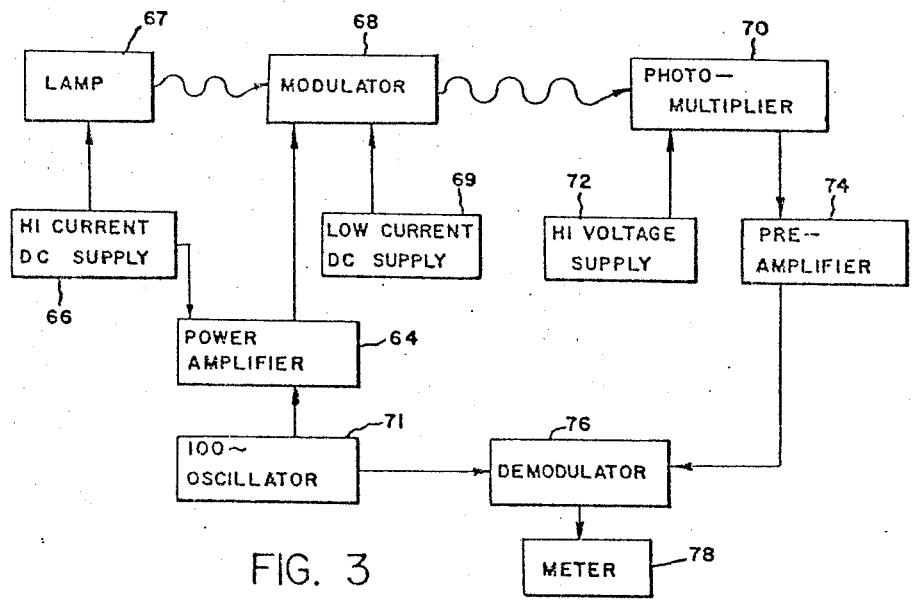
FIG. 3 is a block diagram of an electronic system used in conjunction with the system shown in FIG. 2.

An electronic system used in conjunction with the aforementioned system is shown in FIG. 3. Referring to that figure, a power amplifier 64 is driven by a high current DC power supply 66. The power supply 66 also serves as a source of power for a lamp 67. A modulator 68 includes a coil which is connected to the amplifier 64 and to a low current DC supply 69. A standard signal produced by an oscillator 71 is amplified by the amplifier 64 and fed to the modulator 68. The low current DC supply 69 supplies a DC bias to the modulator coil and is used as a compensator in the system. A high voltage power supply 72 powers a photomultiplier 70 which detects the variations in light intensity impinging thereupon. Such variations are caused by the change in magnetic field produced by the alternating current passing through the coil of the modulator 68 or by rotation of an object about the line of sight. The signal produced by the photomultiplier 70 is fed to a preamplifier 74 which amplifies the signal. The amplified signal is fed to a demodulator 76 which compares the signal with a standard signal. The standard signal is fed to the demodulator 76 from the oscillator 71. A meter 78 is connected to the demodulator 76 and indicates differences between the signal from the photomultiplier 70 and oscillator 71. These differences indicate the direction and angular rotation of an object.

Figure 4:
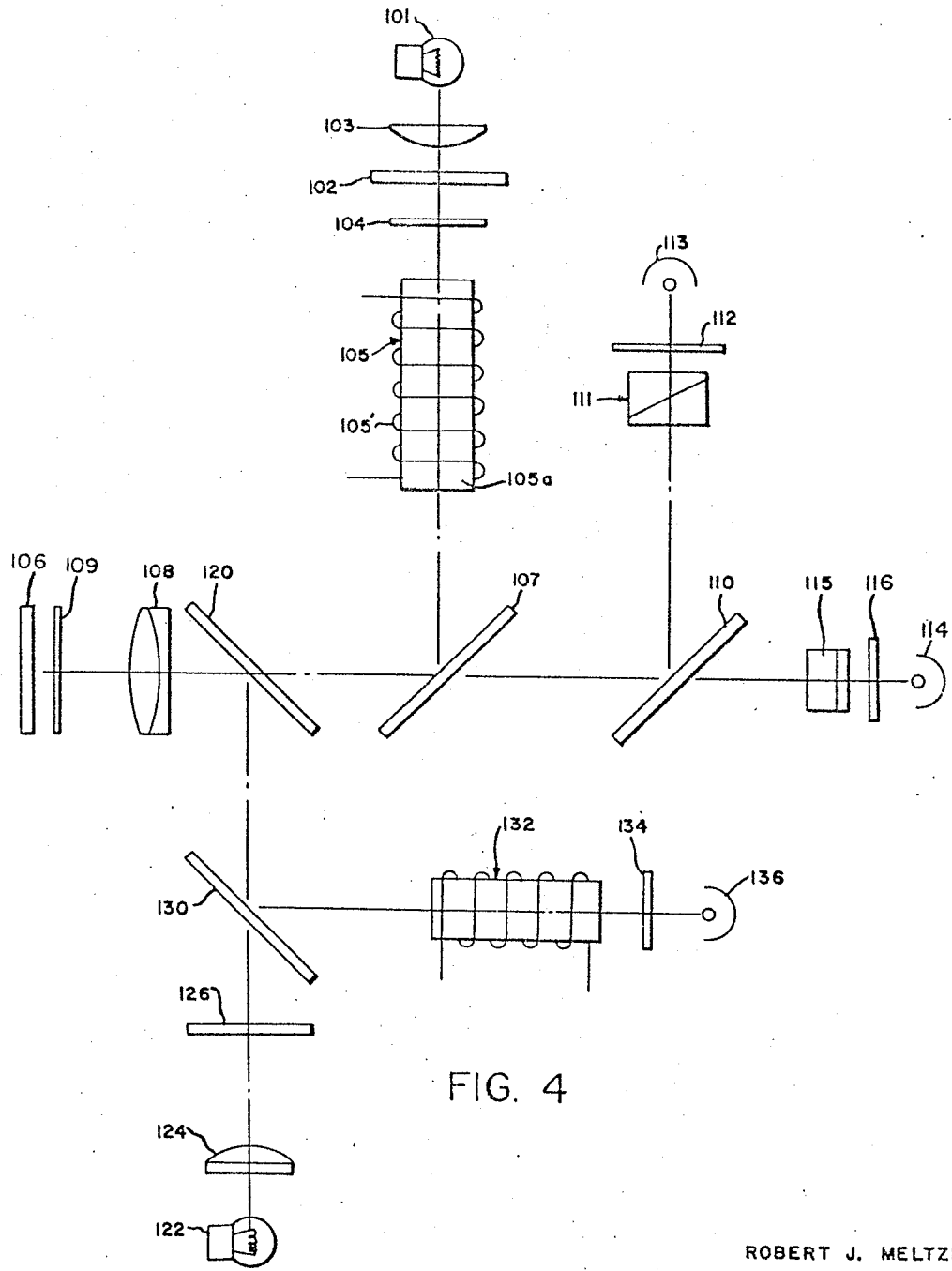
FIG. 4 is a schematic illustration of an optical device according to a second embodiment of the present invention.

A device according to a second embodiment of the invention is shown in FIG. 4. The device includes a light source 101, a reticle 102 and a condenser lens 103. An image of the reticle 102 is projected through a polarizer 104 and a modulator 105. The modulated signal is directed toward a mirror 106 by a beam divider 107. The imaging light rays are collimated by a lens 108 and pass through a ¼λ plate 109 to the mirror 106.

The mirror 106 reflects the rays along the optical axis of the system and through the beam splitter 107 to a second beam splitter 110. Azimuth displacement is indicated by the azimuth optical system which includes a pair of prisms 111, analyzer 112 and photodetector 113. Elevational displacements are sensed by a photodetector 114. The light rays passing through the beam splitter 110 pass through a prism assembly 115 and analyzer 116. The light signal impinging on the photodetector 114 is an indication of the elevational displacement.

The prism assemblies 111 and 115 each include a pair of prisms which are identical except that, one is made of left-hand quartz and the other of right-hand quartz. Therefore, if the light falls along a plane such that the path through the left-hand quartz with respect to the path through the right-hand quartz are equal, there will be no rotation caused by the pair of quartz prisms. When the image falls on either side of the aforementioned position the plane of the bundle of polarized light will be rotated in an amount proportional to the displacement of the image. Since the polarizers 112 and 116 are disposed at right angles with respect to the polarizer 104 no light will pass to the photodetectors 113 and 114 in the absence of rotation. Rotation is caused by the pair of quartz prisms and also by the Faraday magneto-optical effect of the modulator 105 when an alternating current is passed through a coil 105'. The alternating current affects the magnetic field in the coil and thereby changes the rotation due to the effect on transparent media 105a.

The superposition of roll information on top of the azimuth and elevational information would produce problems since the polarization information would cause an apparent displacement in elevation or azimuth when in fact no such displacement had occurred.

In order to overcome this problem, it has been found desirable to separate the roll system from the elevation and azimuth system. The separation of the roll system is accomplished by means of a dichroic beam divider 120. For example, light from a light source 122 passes through a lens 124 and is polarized by a polarizer 126. The dichroic beam divider directs the polarized light through the lens 108, plate 109 to the mirror 106. The mirror 106 reflects the light back through the plate 109. The dichroic beam divider allows the roll system to use the short wave end of the spectrum and the azimuth elevation system to use the long wave end of the spectrum. The two systems are thus completely separated and the events in one system do not produce any effect in the other.

The reflected light passing through the plate 109 is reflected by the dichroic beam divider 120 to a beam divider 130. The beam divider 130 directs the light through a roll modulator 132 and a roll analyzer 134 to a roll photodetector 136.

Polarized light which enters a ½ wave plate at an angle $\theta$ from the preferred orientation of the half-wave plate passes through and leaves the plate at an angle of $-\theta$ from the preferred orientation. If the analyzer and polarizer are coupled so that as the polarizer rotates about the line of sight the analyzer does likewise, the net result is that the half-wave plate appears to have rotated through an angle of $2\theta$.

The system just described employs no moving parts so reliability will be high. The system uses a single detector and source for each channel so that long term drifts are minimized.

The output of the system is three separate phase sensitive error signals each at a frequency that can be made so high the response is not limited by the measurement scheme. The amplitude of the signals is proportional to the error for reasonably larger errors, but can be arranged to give a constant amplitude error signal away from the proportional zone.

While the invention has been described with reference to certain embodiments it should be understood that it may be modified and embodied in other forms without departing from the scope of the appended claims.

What is claimed is:

1. An optical system comprising a magneto-optical modulator comprising a coil and a transparent member disposed within said coil, means supplying alternating current to said coil for periodically varying the direction and magnitude of the magnetic field within said coil to thereby oscillate the plane of polarized light passing through said transparent member, radiation sensitive means for producing an electrical signal in response to radiation applied thereto, a ¼ wavelength plate, a mirror, a polarizer, means for directing a beam of plane polarized radiation along a path through said ¼ wavelength plate to said mirror for reflection by said mirror back along substantially the same path through said ¼ wavelength plate, and subsequently through said magneto-optical modulator and said polarizer to said radiation sensitive means, and circuit means coupled to said means supplying alternating current and said radiation sensitive means for providing a signal corresponding to the rotation of said ¼ wavelength plate about said beam of radiation.

2. A magneto-optical system including a source of nominally monochromatic light, a pair of polarizers having their polarizing axes disposed at substantially right angles with respect to each other, a magneto-optical modulator comprising a coil and a transparent rod disposed within said coil, means providing a source of alternating current to said coil for producing a magnetic field which periodically oscillates the plane of polarization of light passing therethrough, a photoelectric cell positioned to receive light from a first one of said pair of polarizers, a mirror, a ¼ wavelength plate mounted for rotation about a rotational axis, optical means for directing a beam of radiation from a second one of said pair of polarizers through said ¼ wavelength plate along a path coaxial to the rotational axis for reflection from said mirror back along substantially the same path through said ¼ wavelength plate, and subsequently through said magneto-optical modulator and said first polarizer to said photoelectric cell, and circuit means connected to said photoelectric cell for generating a signal corresponding to the amount and direction of rotation of said ¼ wavelength plate about its rotational axis.

3. A magneto-optical system including a first source of nominally monochromatic light, a first pair of polarizers disposed with their polarizing axes at substantially right angles with respect to each other, a first magneto-optical modulator comprising a coil and a transparent rod disposed within said coil, said first modulator positioned to receive light passing through one polarizer of said first pair of polarizers from said source, first means providing a source of alternating current to said coil for producing a magnetic field which periodically oscillates the plane of polarization of light passing therethrough, a first photoelectric cell positioned to receive radiation from the other polarizer of said first pair of polarizers, position sensitive polarization means including a pair of quartz wedges of opposite rotation positioned in inverted relation to each other and disposed in optical series path including said other polarizer of said first pair of polarizers and said first photocell, a second source of monochromatic light, a second pair of polarizers disposed with their polarizing axes at substantially right angles with respect to each other, a second magneto-optical modulator comprising a coil and a transparent rod disposed within said coil, a mirror, a ¼ wavelength plate positioned in optical series with said mirror, second means providing a source of alternating current to said coil of said second magneto-optical modulator for producing a magnetic field which oscillates the plane of polarization of the light passing therethrough, a second photoelectric cell, means for directing a first beam of light from said first modulator along a path through said ¼ wavelength plate for reflection from said mirror back along substantially the same path through said ¼ wavelength plate, and subsequently serially through both quartz wedges and the second polarizer of said first pair of polarizers to said first photoelectric cell, means for directing a second beam of light from said second source through one of said second pair of polarizers through said ¼ wavelength plate along substantially the same path of said first beam for reflection from said mirror along substantially the same path through said ¼ wavelength plate, and subsequently through said second modulation means and the other polarizer of said second pair of polarizers to said second photoelectric cell, circuit means coupled to said first means providing a source of alternating current and said first photocell for generating a signal indication of the angular displacement of said mirror transverse said first beam, and circuit means coupled to said second means providing a source of alternating current and said second photoelectric cell for generating a signal indicative of the rotational displacement of said ¼ wavelength plate about said second beam.

4. An optical system for measuring rotational movement comprising:
   modulation means for periodically oscillating the plane of polarization of a beam of radiation passing therethrough;
   radiation sensitive means for generating an electrical signal in response to radiation applied thereto;
   a polarizer;
   reflection means having a plane reflective surface;
   optical means for directing a beam of plane polarized radiation toward said reflection means at an angle substantially normal to the plane of said reflective surface for reflection through said modulation means to said radiation sensitive means, defining an optical axis for said optical system;
   a rotatable quarter-wave plate having its optical axes positioned substantially normal to said optical system axis and adjacent said reflection means for rotational movement along a plane substantially normal to said optical system axis, receiving said beam of radiation directed toward and reflected from said reflection means, and
   circuit means coupled to said modulation means and said radiation sensitive means for providing a signal corresponding to the angular position of said rotatable quarter wave plate.

5. An optical system for measuring movement comprising:
   first and second modulation means for periodically oscillating the plane of polarization of a beam of radiation passing therethrough;
   first, second, and third radiation sensitive means for generating an electrical signal in response to radiation applied thereto;
   first, second, and third polarizers;
   means for mounting said first and second polarizers with their polarizing axes at substantially right angles;
   reflection means having a plane reflective surface mounted for small angular movement from a reference position;
   a quartz wave plate;
   first and second pairs of optically active wedges, each pair including wedges of opposite optical rotation and being positioned in optical series and inverted with respect to each other;
   means for positioning said first and second pairs of wedges along normal planes and with said first and second pairs of wedges in optical series with said first and second polarizers respectively;

a dichroic beam divider for reflecting a first band of wavelengths and transmitting a second band of wavelengths;

first optical means for directing a polarized beam of radiation having a first wavelength content within said first band of wavelengths through said first modulation means, said dichroic mirror and said quarter wave plate at an angle substantially normal to said reflective surface when in said reference position for reflection from said reflection means through said quarter-wave plate and said dichroic beam divider and along one path through said first pair of wedges, said first polarizer to said first radiation sensitive means, and along another path through said second pair of wedges, said second polarizer to said second radiation sensitive means;

second optical means for directing a second polarized beam of radiation having a second wavelength content within said second band of wavelengths through said dichroic beam divider, and said quarter-wave plate at an angle substantially normal to said reflective surface when in said reference position for reflection by said reflection means through said quarter-wave plate through said dichroic beam divider, said third modulation means and said third polarizer to said third radiation sensitive means, said radiation having a wavelength that corresponds to said quarter wave plate, and circuit means coupled to said first, second, and third modulation means and said first, second, and third radiation sensitive means respectively for providing signals corresponding to small angular movement of said reflection means transverse said first beam with respect to said reference position and the rotational movement of said quarter-wave plate about said second beam.

References Cited

UNITED STATES PATENTS

| 2,442,396 | 6/1948 | Bubb et al. |
| 2,998,746 | 11/1961 | Gievers. |
| 3,016,789 | 1/1962 | Keston _____ 250—225 X |
| 3,200,698 | 8/1965 | Froome et al. |
| 3,241,430 | 3/1966 | Kulick. |
| 3,274,883 | 9/1966 | Kern. |
| 3,284,632 | 11/1966 | Niblack et al. |

OTHER REFERENCES

P. J. Meltzer: Magneto-Optic Positioning, IEE Transactions on Industrial Electronics, vol. IE10, No. 1, May 1963, pp. 46–56.

King et al.: Sensitive Method for the Measurement of Small Rotations, J.O.S.A., vol. 36, December 1959, pp. 507–508.

RONALD L. WIBERT, *Primary Examiner.*

T. MOHR, *Assistant Examiner.*

U.S. Cl. X.R.

356—153